May 27, 1924.
W. W. BIRD ET AL
1,495,316
MACHINE FOR GRINDING THE POINTS OF TWIST DRILLS
Original Filed June 9, 1919   4 Sheets-Sheet 4
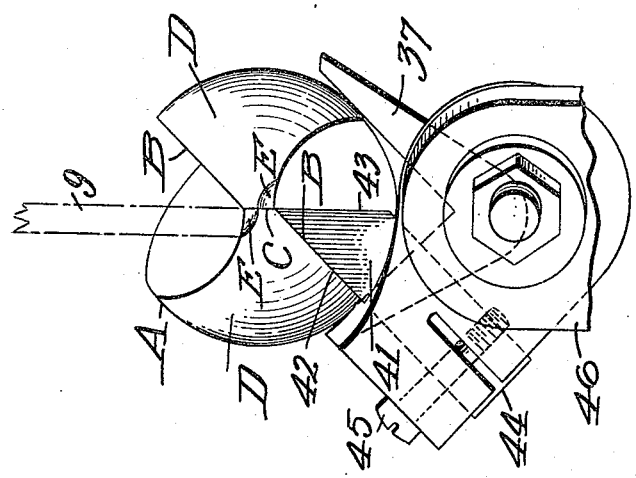
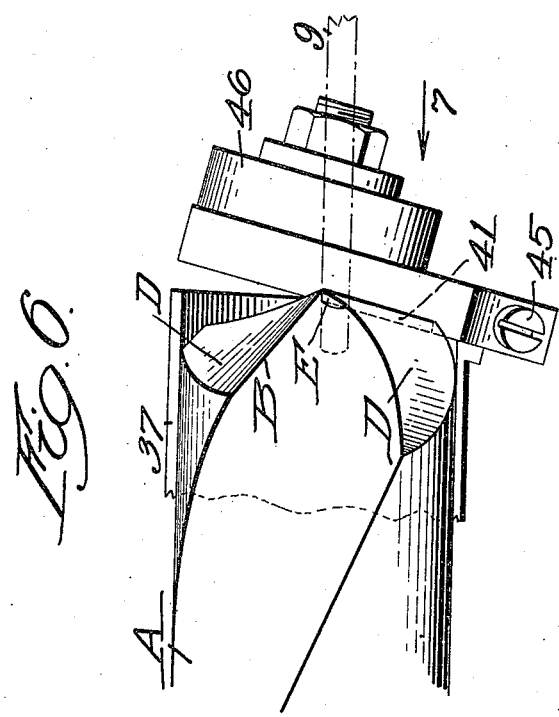

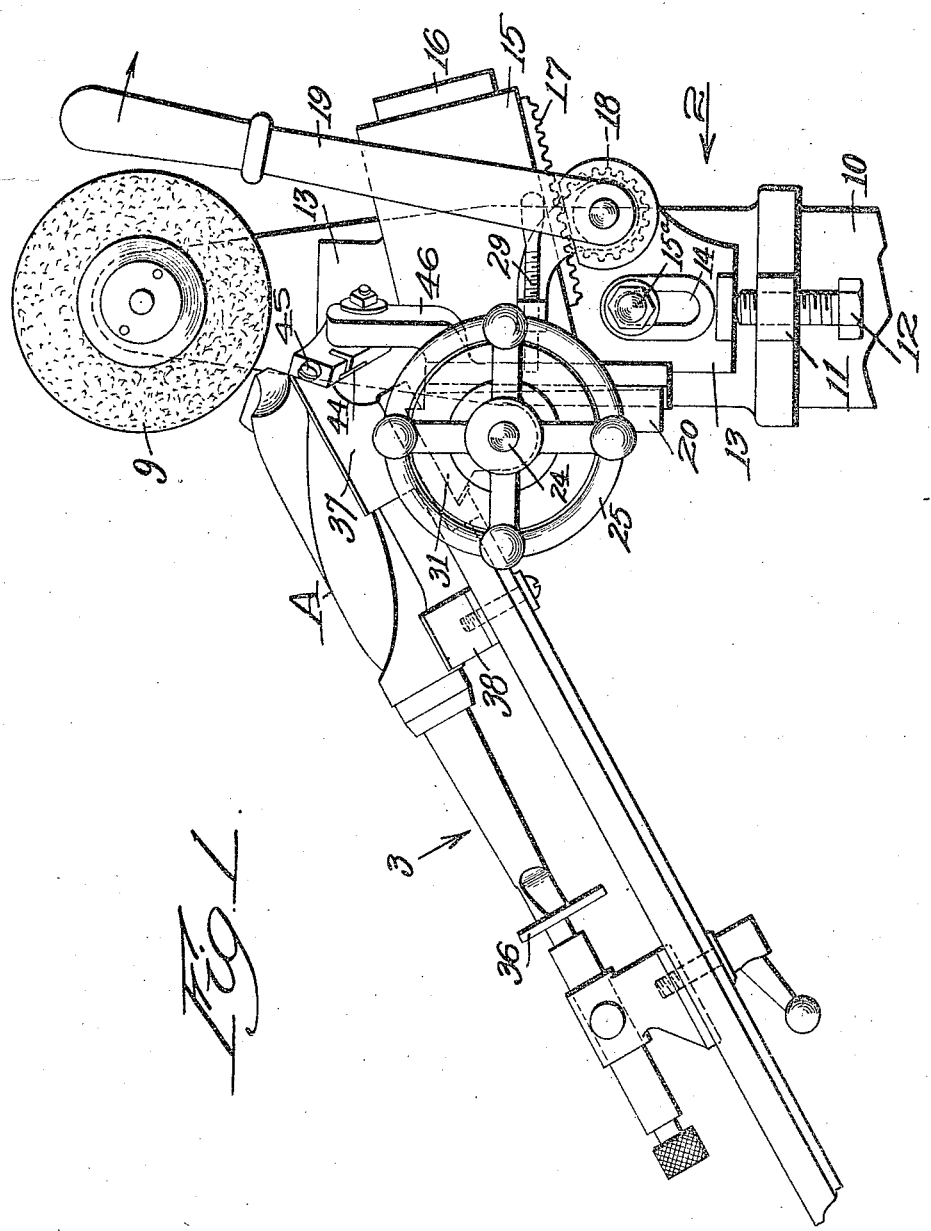

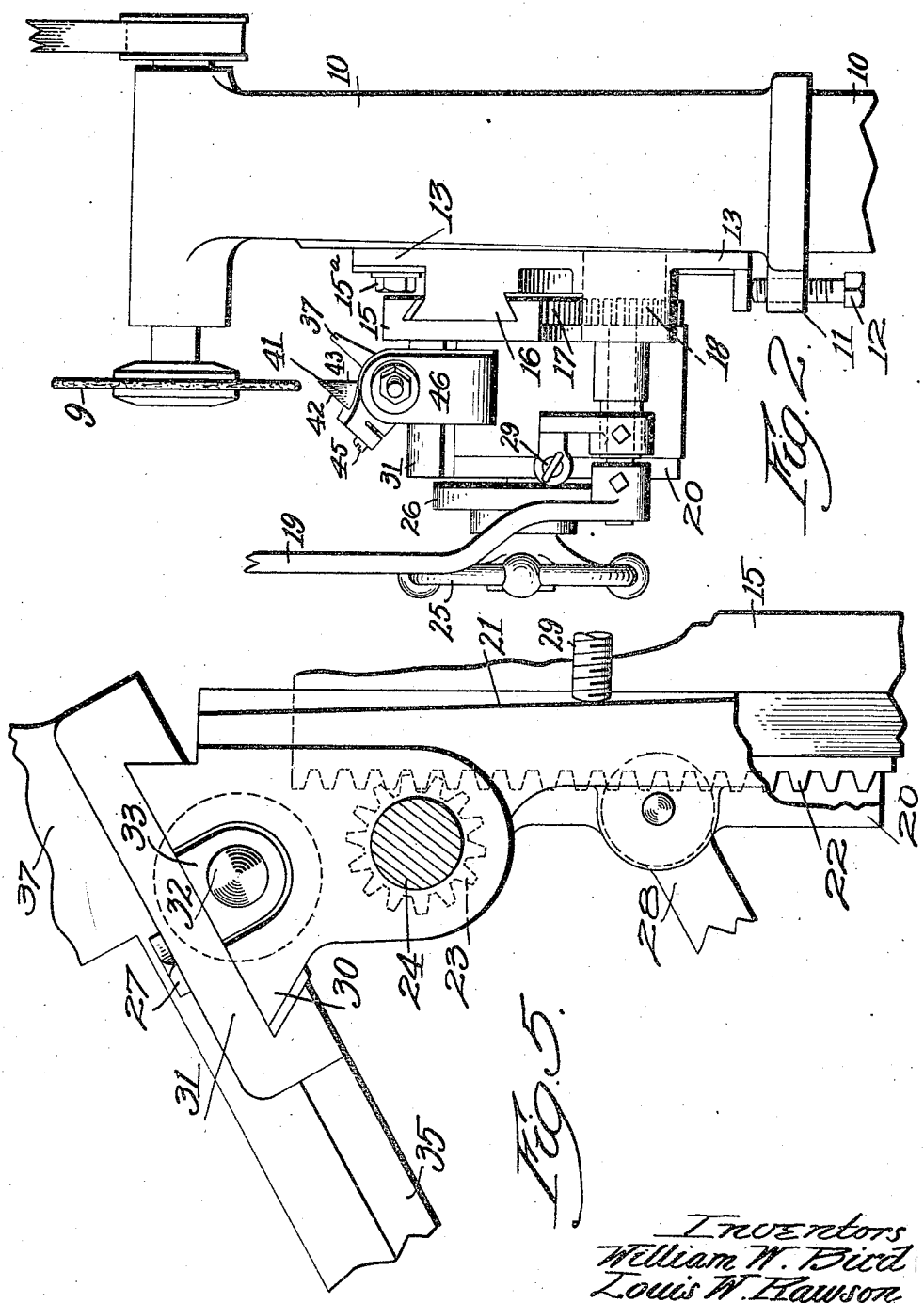

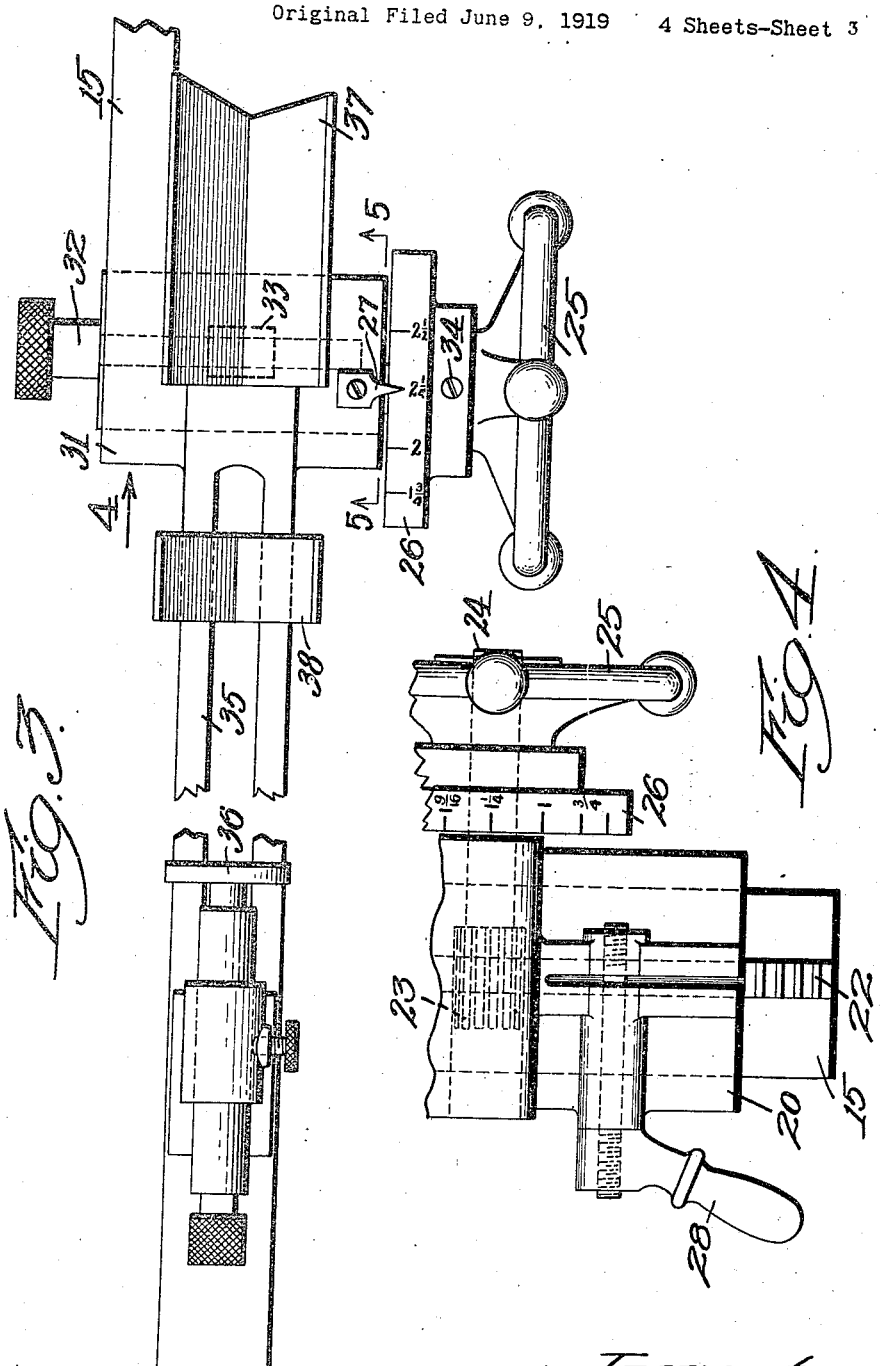

Patented May 27, 1924.

1,495,316

UNITED STATES PATENT OFFICE.

WILLIAM W. BIRD AND LOUIS W. RAWSON, OF WORCESTER, MASSACHUSETTS.

MACHINE FOR GRINDING THE POINTS OF TWIST DRILLS.

Application filed June 9, 1919, Serial No. 302,638. Renewed October 29, 1923.

*To all whom it may concern:*

Be it known that we, WILLIAM W. BIRD and LOUIS W. RAWSON, citizens of the United States, both residing at Worcester, in the county of Worcester and State of Massachusetts, have invented a new and useful Machine for Grinding the Points of Twist Drills, of which the following is a specification.

This invention relates to a machine especially designed for the purpose of producing an improved drill point.

Twist drills, have at the end of the web and in the center of the end face of the drill a straight line which constitutes the point. This ordinarily is not a cutting edge, but as it acts to crush the metal, it retards the progress of the drill and limits the feed. The speed of the drill is limited by the cutting edge at the circumference.

In order to feed large drills rapidly it is sometimes customary to drill a pilot hole first so that this point will not have to grind and crush the metal, but this of course requires two drilling operations.

The principal object of this invention is to increase the feed without reducing the speed or necessitating an extra drilling operation. This is accomplished by grinding two grooves in the convex face of the drill, having certain relationships to each other and to the conical end of the drill, one on each side of the point and one at each end of it. Each groove extends to the center line of the point and provides a cutting edge exactly along this center line throughout half its length, so that together they take up the entire length of this line. This forms what might be called an integral pilot drill having a diameter exactly equal to the thickness of the web.

This is to be distinguished from the ordinary point-thinning which involves the grinding of the web on its two opposite congrinding of the web on its two opposite concave surfaces to provide two approximately longitudinal grooves which result in thinning the web and reducing the length of the center line above mentioned but do not add any cutting edges. By reason of the thinning of the web the drill is weakened at the point at which it is subjected to the most severe strains and many drills are split on account of it. Furthermore, it does not accomplish the object of this invention because it merely reduces the area of the metal which is crushed instead of being cut.

This invention also involves a further advantage in that the grooves which are ground in the convex end extend clear to the center of the drill on that surface and furnish spaces for the escape of the chips.

This invention involves a machine for accurately grinding the convex surface of the operative end of the web of a twist drill to produce the above mentioned results.

The machine also involves means for supporting the drill in a definite relation to the grinding wheel, so that with the drill set properly the wheel must necessarily perform its grinding operation in the right place, and cannot act so as to weaken the web; an adjustment for moving the drill sideways in a very simple manner; means for providing for properly grinding drills of different diameters by the same stone and supported by the same carrier; a stop for limiting the grinding action so that it will be prevented from being carried too far, and adjustments for compensating for the wear of the stone.

Another feature of the invention consists in the particular construction of the rest so that an unskilled workman can set a drill properly to be ground in the desired manner. This is so constructed that the center points of drills of all sizes will always come in the same place when moved forward to grinding position. The parts are designed to be so set that the inside face of the grinding wheel will grind up to the dead center of the drill web. Having been set in that position no further adjustment is required until a new wheel is put on.

The invention involves further advantages and characteristics as will appear.

Reference is to be had to the accompanying drawings, in which,

Fig. 1 is a front elevation of a machine constructed in accordance with this invention showing a drill in position to be properly ground by it;

Fig. 2 is an end view of the same;

Fig. 3 is a view in the nature of a plan looking down on Fig. 1 in the direction of the arrow 3;

Fig. 4 is an elevation looking in the direction of the arrow 4 in Fig. 3;

Fig. 5 is a sectional view on the line 5—5 of Fig. 3; showing the supporting slide in elevation;

Fig. 6 is a plan taken at the same angle as Fig. 3 showing the cutting end of the drill on enlarged scale and the position of the grinding wheel with respect thereto, and Fig. 7 is an end view of the same.

Referring first to the drill A it is to be observed that the two straight cutting edges B are separated at the center by a straight line C which constitutes the end of the web or dead center. There are two convex surfaces D constituting the ends of the body of the drill and each terminating in a cutting edge B.

In drills over half an inch in diameter the length of the line C is great enough to constitute a real source of inefficiency because, having no cutting surfaces, it has to be forced through the metal by crushing or grinding the same. According to the present invention the point is not thinned by reducing the length of this line and weakening the web but the two conical surfaces D are grooved at E by grinding a shallow groove therein each constituting a nearly cylindrical surface having its axis located nearly parallel with the conical end surface in which it is located as will be seen by reference to the relative position of the drill and metal working member or grinding wheel 9 in Fig. 1. This groove is not exactly cylindrical for it is curved longitudinally, the curvature being the same as that of the surface of the grinding wheel. It may be considered as constituting part of a torus. The groove extends on one of its longitudinal sides to the center line of the point and extends half way along the same. The two grooves therefore coming from opposite sides of the drill provide two cutting edges along this line oppositely located with respect to the length thereof. Preferably about where one ends the other starts.

It will be seen by reference to Figure 7 especially that the relation of the stone to the drill is such that one of its edges substantially coincides with and constitutes a continuation of this center line C, and as the stone is convex on its grinding surface it will provide a groove having the above mentioned characteristics. The axes of the two grooves, considering them as constituting parts of cylindrical surfaces lie in parallel planes separated from each other by a distance equal to the thickness of the stone, but they are oppositely inclined.

For the purpose of accomplishing these results the machine is shown as comprising a frame or head 10 for supporting the operating tool, shown as a grinding wheel 9, in bearings at the top thereof, this wheel being operated in any desired manner. On the frame is an enlarged lug 11 carrying an adjusting screw 12 bearing on the bottom of a movable slide 13 which supports the parts that carry the drill to be ground. This slide 13 has slots 14 for permitting vertical adjustment and through these slots pass bolts 15ª carried by the main support or head 10 for fixing it in its vertically adjusted positions. The head 10 has a vertical surface on one side along which the slide is adjusted. The adjustment by means of the screw 12 is to compensate for wear of the grinding wheel.

This slide 13 is provided with inclined dove-tail guides 16 on which is mounted an inclined operating slide 15. This slide is provided with a rack 17 operated by a pinion 18 carried by a shaft having bearings on the slide 13 and an operating handle 19 to swing with it to move this slide 15 back and forth. This, as will appear, carries the drill toward and from the grinding wheel. The slide 15 also carries vertical dove-tail ways on which is mounted a slide 20. The slide 15 also carries a rack 22 arranged vertically and designed to be engaged by a pinion 23 carried by the slide 20 to secure vertical adjustment to carry the drill up far enough toward the grinding wheel. The face of this slide is provided with a slightly inclined surface 21 which, during the movement of the slide on its ways 16, is adapted to come in contact with the stationary but adjustable stop screw 29 to limit its motion toward the wheel. This face 21 is machined at an angle so as to stop drills of every size in the capacity of machine at the center of the drill. It is necessary that the surface 21 be inclined because as the diameter of the drill increases the thickness of the web also increases, and therefore the center point of the drill is carried further away from the grinding wheel. Or in other words, the slide 20 is adjusted to a lower level for a large size drill. This face is so constructed that the center points of drills of all sizes are always in the same plane when carried forward to the grinding wheel by the mechanism to be described below.

The pinion 23 is mounted on a shaft 24 which carries a hand wheel 25. On this hand wheel there is a circular scale 26, which is adapted to be turned with the shaft until the one of its divisions which indicates the size of the drill to be ground registers with a stationary pointer 27. This adjusts the machine for the size of drill, the scale being calibrated for that particular purpose and corrected to take care of the increase in thickness of the web as the size of the drill increases. The slide is locked in position by a binder 28. The correlation between this scale and the inclined surface 21 will be obvious. The hand wheel and scale are originally set to a definite point about the shaft 24. Then the screw 34 is tightened so as to fix the scale to the shaft and hand wheel and no further adjustment has to be made with the scale and shaft.

On the shaft 24 and of course supported by the slide 20 there is a dove-tail guide 30 which carries a cross slide 31. A screw 32 and nut 33 are provided for this side adjustment. The object of this particular adjustment is to bring the inside face of the grinding wheel to the dead center of the drill web independently of any other adjustment. Once being set it requires no further adjustment until a new wheel is put on even if the machine is in the meantime adjusted for drills of different sizes.

This slide 31 is provided with an extension 35 on which is an adjustable stop 36 for engaging the end of the drill and holding it properly in two holders 37 and 38, which are also mounted on this slide 31. This holder 37 is an important element of the invention as it is by it that the position of the drill is controlled. It has a V-shaped support and therefore serves for drills of all sizes. It has at the forward end a lip-rest 41 which has two edges 42 and 43 the former being located at such an angle to the vertical that the dead center line of the drill will be vertical when the cutting edge B of the drill is placed on this edge 42. This lip is therefore a gauge for the drill, and as this incline is independent of the size it serves for drills of all sizes. It is fixed to the slide 15 by an extension 44 which enters a split socket in an extension 46 on the slide and is held in place by a screw 45. It never needs adjustment after once being placed properly in position unless the machine is to be used for drills with a different clearance, in which case the angle made by the cutting lip and the dead center line is different.

The screw 12 it will be understood has to be adjusted to raise the whole device to compensate for any wear on the grinding wheel and is originally adjusted to bring the parts to proper height to properly grind a drill of some predetermined standard size with the hand wheel set for that size. The stop 29 has to be adjusted properly at this time. The screw 32 is operated by hand to move the whole drill holder sideways until the inside surface of the stone 9 coincides with the vertical edge 43 and therefor also with the center line C of the drill. This adjustment can be made before it is decided what sizes of drills are to be ground, and without a drill in position. It does not have to be changed until the grinding wheel is changed.

To adjust the machine for operation on a particular drill, the drill is placed in the holders with its end against the stop 36 and the hand wheel 25 is turned until the drill comes to such position that it lies there without rocking, with its lower cutting lip B resting on the edge 42 of the lip rest and the dead center lies in vertical position and the binder 28 is then tightened. An observation is made for the size of the drill and the scale 26 is turned until the character on the scale, as for example 2¼, which indicates the diameter of the drill being ground, is brought to coincide with the stationary pointer 27 and fastened in this position by set screws 34 and no further adjustment of the scale is necessary for drills of the same clearance.

The parts having been so adjusted the operator manipulates the handle 19 to move the slide 15 and its supported members with the drill thereon forward towards the wheel. This operation continues until the machined face 21 on the slide 20 engages the stop 29 which positively stops it and prevents grinding too far. It is to be noticed that in operating the machine the drill is brought to the wheel in such a way that the face of the drill is ground to the center or just past the center if desired.

It is to be noted that the adjustments above described are for the following purposes. The vertical slide 20 is adjusted for different sized drills. The vertical slide 13 is adjusted to compensate for wear of the grinding wheel and the horizontal slide 31 locates the position of the dead center relative to the plane of the surface of the grinding wheel. The machine is so designed that the center line of every drill within the capacity of the machine is always in the same position, that is, parallel with the inside face of the grinding wheel, and, in the form shown, vertical. The slide 15 by its movement carries the drill to the grinding drill. The stop piece 29 controls the depth ground on the end of the drill.

It is to be observed that a conical convex end of the drill is ground in this way on one side so that half of the dead center line C is converted into a cutting lip. Then the drill is reversed just half way around and the other side ground in the same way so as to provide the other cutting lip.

These cutting lips are as stated, formed by the two grooves E which are ground on axes in parallel planes and constitute really a pilot drill having a diameter equal to the web thickness of the drill at the point. This pilot drill, however, has no web thickness and its cutting lips are on a straight line, which is the line of the dead center of the original drill. This extends the cutting lips B to the center of the original drill and eliminates the necessity for any crushing of the metal at the dead center.

It is to be observed also that these grooves E furnish spaces for the escape of the chips cut out by the so-called pilot drill cutting lips.

It will be seen that by this means the desired action on the drill can be secured; that the machine is capable of performing the same function for drills of various sizes, and in fact is universally applicable for this purpose. It will be seen also that the operation of grooving the drills is so simple and requires so little skill on the part of the mechanic that if one of these machines is handy it will be constantly used because the mechanics will soon learn that their drills will feed much more rapidly and easily if the points are kept in order by the use of this machine. We have doubled and in fact trebled the feed in certain cases by this machine.

The objection to point-thinning is entirely overcome because no groove is made along the web of the drill, and consequently there is no weakening thereof, the cutting being transverse to the web and only slightly inclined from the transverse.

Although we have illustrated and described only a single form of machine for carrying out this invention we are aware of the fact that many modifications can be made therein by any person skilled in the art without departing from the scope of the invention as expressed in the claims.

Therefore we do not wish to be limited to all the details of construction herein shown and described but what we do claim is:

1. The combination with a drill support, of means located in such relation to the drill support as to form a groove with its longitudinal dimension nearly at right angles to the axis of the drill to produce a groove on the convex end surface of a drill located on the drill support, said groove being located along the dead center and substantially parallel with it and extending all the way to the line that constitutes the end of the web so as to form a cutting edge along said dead center half-way through it.

2. The combination with a drill support having a gauge, of a grinding wheel located in position to form a sharp cutting lip along the dead center of a drill located in the drill support with its cutting lip in contact with said gauge.

3. The combination with a grinding wheel, of a movable drill support in the plane of the wheel having a lip rest at its end located between the center of the wheel and the tangent to the wheel that is parallel to the drill supporting surface for locating the drill in such position that when brought up to the wheel the latter will grind a slightly inclined groove in the convex surface of the drill along the dead center on one side thereof.

4. In a machine of the character described, the combination of a support for a drill, a metal working member located beyond the end of the drill when on said support in such position that the axis of the drill intersects the grinding wheel along a line at a material distance from its circumference, and means for moving the drill support toward the edge of said member along a path transverse to the center line of the drill.

5. In a machine of the character described, the combination of a support for a drill, a lip rest carried by said support and having a gauging edge for receiving the cutting lip of the drill and locating it in such position that the dead center of the drill will be substantially vertical, and a grinding wheel located to turn on a horizontal axis beyond the end of the support but at a distance, from the center of the drill carried thereby, less than the diameter of the wheel.

6. In a grinding machine, the combination of a support for a drill, a lip rest carried by said support and having a gauging edge for receiving the cutting lip of the drill and locating it in such position that the dead center of the drill will be in a vertical plane, and a grinding wheel located with its two opposite flat sides in vertical position parallel with the length of said support and its operative edge in position for engagement with the end of said drill.

7. In a grinding machine of the character described, the combination of a lip rest for a drill having an edge for receiving the cutting lip of the drill and locating it in such position that the dead center of the drill will be substantially vertical, and a grinding wheel located with its two opposite flat sides in vertical position and on opposite sides of the axis of a drill in said support and its inside face substantially coincident with the said dead center.

8. In a grinding machine of the character described, the combination of a V-shaped support for a drill, a lip rest carried by said support and having a guiding edge for receiving the cutting lip of the drill and locating it in such position that the dead center of the drill will be substantially vertical, a grinding wheel located with its two opposite flat sides in vertical position in planes parallel with the axis of a drill carried by said support, and means for raising and lowering the drill support toward and from the grinding wheel.

9. In a machine of the character described, the combination of a support for a drill, a lip rest carried by said support, a rack, a pinion meshing therewith, a shaft on which the pinion is mounted, a scale rotatable with said shaft, a fixed pointer, and a metal working member, whereby the scale can be set with respect to the pointer for moving the drill holder the required distance toward or from said member in order to operate on drills of different sizes.

10. In a grinding machine of the character described, the combination of a V-shaped support for a drill, a lip rest carried by said support and having a guiding edge for receiving the cutting lip of the drill and locating it in such position that the dead center of the drill will be vertical, a vertical rack, a pinion meshing therewith, a horizontal shaft on which the pinion is mounted, a scale rotatable on said shaft, a fixed pointer, whereby the scale can be set with respect to the pointer for raising the drill holder the required distance in order to grind drills of different sizes.

11. In a grinding machine of the character described, the combination of a V-shaped support for a drill, a lip rest carried by said support and having a vertical guiding edge for receiving the cutting lip of the drill and locating it in such position that the dead center of the drill will be in a vertical plane, a grinding wheel located with its two opposite flat sides in vertical position for engagement of its edge with the end of said drill, means for raising and lowering the drill support toward and from the grinding wheel, and means for holding the drill holder in the position to which it is adjusted.

12. In a machine of the character described, the combination of a movable support for a drill, means for engaging the butt end of the drill movable with said support, an operating wheel located beyond the end of the drill when on said support, and in the same plane, and means for moving the drill toward the wheel along a path transverse to the center line of the drill.

13. In a grinding machine of the character described, the combination with a guiding wheel, of a support for a drill located in a plane parallel with the flat sides of said wheel, a lip rest carried by said support and having a guiding edge for receiving the cutting lip of the drill and locating it in such position that the dead center of the drill will be in a parallel vertical plane, and means for adjusting the drill support toward and from the wheel to compensate for the wear of the grinding wheel 14. In a machine of the character described, the combination of a member adapted to be fixed in position, a movable support thereon for a drill, a wheel located beyond the end of the drill when on said support, means for moving the drill support toward the wheel, means for adjusting the drill support in a different direction, a stop surface movable with said drill support and inclined relatively to the direction of said adjustment, and a stop on said member for engaging said surface and limiting the movement of the drill toward the wheel to different degrees according to said adjustment.

15. In a machine for operating on drills, the combination of a fixed head, a slide vertically adjustable thereon and having an inclined guiding surface, a second slide movable along said inclined surface, a pivoted handle having means for moving the second slide, said second slide having a vertical guide, a third slide movable up and down the vertical guide, the third slide having an inclined surface, an adjustable stop supported by the first slide for engaging said inclined surface and stopping the motion of the second slide in different positions according to the position of the third slide, a transverse slide adjustable on the vertical slide, a drill support carried in inclined position on the transverse slide, and means located in stationary position for operating on the end of a drill on said drill support.

16. In a machine for operating on drill, the combination of a head, a slide vertically adjustable thereon and having a guiding surface, a second slide movable along said surface, said second slide having a vertical guide, a third slide movable up and down the vertical guide, a transverse slide adjustable on the vertical slide, a drill support carried in inclined position on the transverse slide and means for operating on the end of a drill on said drill support.

17. In a machine for operating on drills, the combination of a slide movable along an inclined surface, means for moving the slide, said slide having a vertical guide, a vertical slide movable up and down the vertical guide, the second slide having an inclined surface, an adjustable stop supported in fixed position for engaging said inclined surface and limiting the motion of the first named slide in different positions according to the position of the vertical slide, a member on the vertical slide, a drill support carried on the said member, and means located in stationary position for operating on the end of a drill carried on said drill support.

18. In a machine for operating on drills, the combination of a slide movable transversely, and having a vertical guide, a vertical slide movable up and down the vertical guide, a transverse slide adjustable on the vertical slide, a drill support carried on the transverse slide, and means for operating on the end of a drill placed on said drill support.

In testimony whereof we have hereunto affixed our signatures.

WILLIAM W. BIRD.
LOUIS W. RAWSON.